United States Patent [19]

Kirkpatrick

[11] Patent Number: 4,458,137
[45] Date of Patent: Jul. 3, 1984

[54] ELECTRIC HEATER ARRANGEMENT FOR FLUID FLOW STREAM SENSORS

[75] Inventor: William R. Kirkpatrick, Faribault, Minn.

[73] Assignee: Rosemount Inc., Eden Prairie, Minn.

[21] Appl. No.: 252,289

[22] Filed: Apr. 9, 1981

[51] Int. Cl.³ .................. H05B 3/02; G01F 1/46; G01P 5/16; H01C 7/02

[52] U.S. Cl. .................. 219/201; 73/182; 73/861.65; 73/861.68; 219/209; 219/280; 219/301; 219/308; 219/328; 219/505; 338/22 R; 338/23

[58] Field of Search .............. 219/201, 200, 209, 280, 219/308, 504, 505, 328, 301; 338/22 R, 23; 73/861.65, 861.68, 182

[56] References Cited

U.S. PATENT DOCUMENTS

| | | | |
|---|---|---|---|
| 1,767,249 | 6/1930 | Leckie et al. | 219/505 X |
| 1,919,068 | 7/1933 | Lauster | 219/245 X |
| 2,221,547 | 11/1940 | Kollsman | 73/861.68 |
| 2,300,654 | 11/1942 | Daiber . | |
| 3,030,807 | 4/1962 | Scadron | 219/280 X |
| 3,187,164 | 6/1965 | Andrich | 219/504 X |
| 3,338,476 | 8/1967 | Marcoux | 222/146 |
| 3,375,774 | 4/1968 | Fujimura et al. | 99/281 |
| 3,476,293 | 11/1969 | Marcoux | 219/504 X |
| 3,488,470 | 1/1970 | Weaver | 219/201 |
| 3,535,930 | 10/1970 | Rees | 219/201 X |
| 3,835,434 | 9/1975 | Kahn | 338/22 |
| 3,882,721 | 5/1975 | Neary et al. | 73/188 |
| 4,000,647 | 1/1977 | Tauchmann | 73/861.68 X |
| 4,045,763 | 8/1977 | Miyamoto et al. | 338/23 |
| 4,121,088 | 10/1978 | Doremus et al. | 219/201 |
| 4,151,401 | 4/1979 | VanBokestal et al. | 219/508 |
| 4,245,146 | 1/1981 | Shioi et al. | 219/381 |
| 4,246,468 | 1/1981 | Horsma | 219/553 |
| 4,246,787 | 1/1981 | Harper . | |
| 4,354,822 | 10/1982 | Madsen et al. | 219/301 X |

FOREIGN PATENT DOCUMENTS

| | | |
|---|---|---|
| 2456905 | 12/1980 | France . |
| 490481 | 8/1938 | United Kingdom ............. 219/505 |
| 1371709 | 10/1974 | United Kingdom . |

OTHER PUBLICATIONS

Electronic Engineering, Mar. 1977, p. 24.

Primary Examiner—A. Bartis
Attorney, Agent, or Firm—Kinney, Lange, Braddock, Westman and Fairbairn

[57] ABSTRACT

An air data sensor device, such as a pitot, total air temperature sensor, etc., includes an elongated probe having a sensor therein for sensing air flow parameters and a strut for positioning the probe in a desired position on an air vehicle. To avoid ice build-up on the device causing erroneous sensing of air flow parameters a substantially constant wattage electric resistive heater is provided in the probe for deicing. A PTC (positive temperature coefficient) resistive heater is disposed in the support at a location thermally isolated from the probe heater but in thermally conductive relationship to the external surface of the support. The PTC heater is connected in series with the probe heater and continuously varies heater power in response to the rate of heat dissipation at the external surface of the sensor device thereby preventing burn-out of the probe heater and erosion of the probe. A second constant wattage heater connected in parallel with the PTC heater is located within the probe and has a maximum rated power selected to insure that during conditions of minimum heat dissipation of the probe heater sufficient additional heat is supplied to the probe to perform the deicing function without raising the probe to damaging temperatures.

10 Claims, 5 Drawing Figures

ELECTRIC HEATER ARRANGEMENT FOR FLUID FLOW STREAM SENSORS

BACKGROUND OF THE INVENTION

1. Field of the Invention

The present invention relates to an improved heater for air data sensing devices and in particular to regulating the temperature of such air data sensors through the use of PTC resistive material.

2. Prior Art

As used herein, a conventional resistive heater is considered one which does not substantially increase in resistance across its range of operating temperatures. A PTC heater has the property of increasing in resistance a substantial amount at a temperature within its normal operating range.

In the prior art the use of PTC resistive material for various heating devices has been disclosed. For example, in U.S. Pat. No. 4,121,088, held by the same assignee as the present invention, a PTC resistive heater is used in combination with an angle of attack vane to provide automatic means for maintaining the temperature of the vane at a level which will de-ice the vane. The preferred means of connecting and insulating the PTC heater elements are disclosed therein and incorporated herein by reference. Though the device in U.S. Pat. No. 4,121,088 has received favorable commercial acceptance, it is distinct from the present invention in that the vane heater consists solely of the PTC resistive material.

In U.S. Pat. No. 3,488,470, an electrical heating element is embedded in an electrical insulating sheath in a pressure head for aircraft. Further disclosed therein is the element of wire of the type having a high temperature resistance coefficient for providing automatic thermal regulation.

In U.S. Pat. No. 4,000,647, a plurality of thermally controlled resistance means are annularly deposited in a probe (sonde). Two practical constraints in the design of a probe are, one, to minimize probe size in order to minimize aerodynamic drag therefrom, thereby maximizing the contribution of the probe to the fuel efficiency of the aircraft and, two, to provide adequate heating of the probe, especially in the tip area of the probe that is most critical with regard to icing. The result is that the heating means selected must be constructed in a very constricted space, especially in the critical tip area. Due to their relatively large size and their limitations on possible shape, known PTC resistive heaters have not been readily adaptable for use in such probes.

PTC material has also found wide acceptance as a switch capable of providing heat protection as exemplified by affixing the material to an electrical motor to switch the motor off if temperature exceeds a certain value.

U.S. Pat. No. 3,374,774, Fully Automatic Electric Coffee Pot, is an extension of this concept in that it uses the PTC material essentially to switch from one heater to another at a certain temperature. This invention has a heating unit for the liquid which consists of a conventional alloy resistive heater connected in series with a PTC resistive heater made of barium-titanate. In this application, the liquid is first heated to boiling by the conventional alloy resistive heater to brew the coffee and then, using the PTC characteristic, the conventional alloy resistive heater is substantially switched off and, simultaneously, the lower heat output PTC resistive heater is switched from being substantially off to on, to keep the coffee warm without further boiling. As described, the PTC characteristic is used to digitally switch from a high output heater to a low output heater when the desired conditions exist.

Present heating of flow sensor probes for air vehicles is done with resistive heaters, typically constructed of Ni-Cr (nickel-chromium) alloy. The maximum rated power of the heater must be such that sufficient heat for satisfactory performance of the sensor under the most severe icing conditions is supplied. In order to reduce aircrew task loading, such heaters are typically automatically energized when the aircraft is operating on internal power. The heater then operates continually at maximum rated power. The result in that while the aircraft is on the ground, which is the condition of minimum heat dissipation from the sensor, the heater causes inordinately high temperatures in the sensor. Temperatures of 550° C. are not uncommon. Such temperatures may result in burn out of the heater and also contribute to erosion of the probe features due to impingement of salt in the airstream when airborne at low altitude, both of which affect the accuracy of the instrument. Such temperatures also contribute to the creation of a safety hazard. Accordingly, it is desirable to provide a heater power control system that will continuously vary heater power in response to rate of heat dissipation being experienced at the external surface of the sensor. In order to preserve the reliability of the sensor system, it is desirable that the heater power control system be passive as opposed to an active electronic system.

SUMMARY OF THE INVENTION

In flow sensor devices for air vehicles such as pitot, pitot-static, total air temperature sensors or the like, the device typically consists of two basic elements; an elongated housing member such as a probe or sonde having means for sensing airflow parameters, and a mounting member such as a strut or boom for mounting the housing member in a desired position on an air vehicle or in an air stream. A known condition to be avoided is the build-up of ice on the device or elements thereof, as such ice disrupts or may wholly interrupt the normal flow pattern over and through the device, thus causing the sensing element to provide data which is not representative of the actual air flow conditions. Conventional resistive heaters, such as wire-wound resistors, and PTC resistors disposed in the sensor to provide de-icing and anti-icing are known. The present invention takes advantage of each of these types of resistive heating elements by utilizing them cooperatively. A PTC resistive heater is, preferably, disposed inside the strut of an air data sensing device in a thermally conductive relationship with the leading edge of the strut. The PTC resistive heater is coupled, preferably in series, to a conventional resistive heater element disposed in the probe to control the current to the conventional resistive heater element. A conventional power supply is coupled to the PTC resistive and the conventional resistive heater elements.

It is understood that due to space limitations in the tip of the probe, known PTC resistive material cannot be utilized in that portion of the probe. This results in the need to utilize the conventional heater in this area.

Two extremes of operation experienced by the heater are typified by considering an air vehicle first at rest on the ground and then in high speed flight at altitude in icing conditions. At rest on the ground, very little heat is being dissipated from the external surface of the sensor. When energized, the PTC resistive heater will heat up causing its resistance to increase toward its maximum value ($R_{max}$) and, thus, causing current in the PTC and conventional resistive heater circuit to be very low. $R_{max}$ is typically between 400 and 1,000 ohms. This low current produces minimal power dissipation, resulting in minimal heating in both the fixed resistance conventional resistive heater and the PTC resistive heater. Under conditions of maximum rate of heat dissipation at the external surface of the sensor, as experienced during flight in icing conditions, the high rate of heat dissipation will cool the PTC resistive heater. Such cooling causes its resistance to drop toward its minimum value ($R_{min}$). Preferably, the resistance of the conventional resistive heater is selected to be approximately equal to $R_{min}$ of the PTC resistive heater. The range of resistance values for $R_{min}$ and the resistance of the conventional resistive heater is typically 8 to 20 ohms. In this condition, total circuit resistance is at its minimum value and current is at its maximum value, resulting in the maximum power dissipation from the circuit. Since $R_{min}$ of the PTC resistive heater and the resistance of the conventional resistive heater are approximately equal in value, the voltage drop across each heater is approximately equal, and equal amounts of power are dissipated in the PTC resistive heater and the conventional resistive heater, providing ample heating in both the probe and strut for de-icing.

The resistance versus temperature characteristic of the PTC resistor causes the power of the circuit to vary in an analog manner between the aforementioned extremes responsive to the amount of heat being dissipated at the external surface. The nature of this positive temperature coefficient of resistance characteristic of the heater is to seek to maintain itself at a certain temperature called the anomaly or Curie temperature ($T_a$). In order to maintain $T_a$, an increased rate of heat dissipation results in an increase in total circuit power dissipation. Correspondingly, a reduced rate of heat dissipation results in a reduction in demand for circuit power dissipation.

The PTC resistive material preferably used is doped barium titanate, a well known ceramic material that displays rather abrupt positive temperature coefficient properties characterized by a large change in resistance through a narrow band of temperature about $T_a$ and is used widely in other applications. It is understood that other material that exhibits similarly abrupt positive temperature characteristics at a certain temperature is also suitable for use in the PTC resistive heater. Further, it is understood that the PTC resistive heater will function to control the heating of the conventional heater if the PTC resistive heater is located anywhere in the sensor such that it is thermally isolated from the conventional heater but in a thermally conductive relationship with the external surface of the sensor.

DESCRIPTION OF THE PREFERRED EMBODIMENTS

Figure 1:
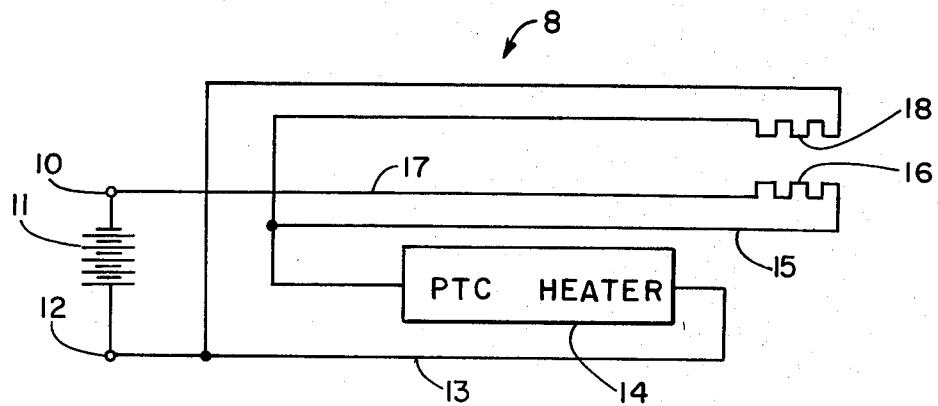
FIG. 1 is a schematic representation of the electric circuit used with the heater of the instant invention.

A circuit 8 according to one preferred embodiment of the invention is shown in FIG. 1. Terminals 10 and 12 are coupled to external conventional power source 11, which may be either an AC or a DC supply. Terminal 12 is coupled by a line 13 to PTC (positive temperature coefficient) resistive heater 14, which in turn is coupled by a line 15 to one end of a conventional resistive heater 16. A second end of conventional resistive heater 16 is coupled by a line 17 to terminal 10, thereby forming a series circuit. Conventional resistive heater 16 is preferably formed from a Ni-Cr (Nickel-Chromium) alloy. The PTC resistive heater 14 is preferably constructed with a ceramic body of barium titanate material, which material has the characteristic of abruptly changing its value of resistance from a low value to a high value through a narrow band of temperature increase. Such resistive materials are disclosed in the prior art.

FIG. 1 additionally shows second conventional resistive heater 18. Preferably, such heater is located proximate to conventional resistive heater 16 to provide supplemental heating. As shown, second conventional resistive heater 18 is coupled at one end to line 13 and at a second end to line 15. Thus, heater 18 is connected in the heater circuit in a parallel electrical relationship with PTC resistive heater 14. It is understood that second conventional resistive heater 18 could also be powered from a source independent from that powering the instant heater circuit and is then electrically independent from the circuit containing PTC resistive heater 14 and conventional resistive heater 16.

Figure 2:
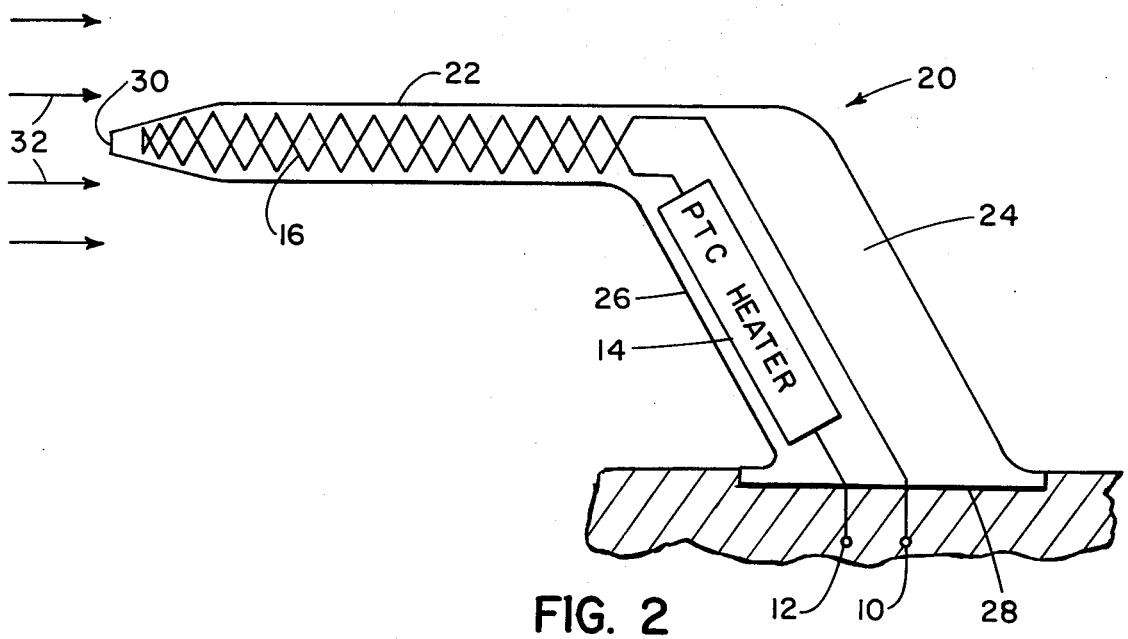
FIG. 2 is a schematic representation of an air data sensor showing a preferred embodiment of the heater located relative to the air data sensor.

FIG. 2 shows a flow sensor 20, schematically illustrating the representative relative internal location and connection of the heater circuit elements. Flow sensor 20 consists of a probe shown generally at 22 supported by a strut shown generally at 24. Strut 24 is mounted at a base 28 to the surface of an air vehicle such that probe 22 is aligned as desired with respect to the fluid flow shown by arrows at 32. Terminals 10 and 12 are carried through the skin of the air vehicle and connected to a conventional AC or DC power source located external to sensor 20.

Probe 22 is typically a tube with an opening at tip 30 for sensing pressure of the fluid flow indicated by arrows 32 and is connected to suitable tubing in strut 24 to convey pressure signals into the air vehicle for calculation of fluid flow parameters by equipment associated with the flow sensor 20 but located in the air vehicle. Typically, conventional resistive heater 16 is wound on probe 22 and is so shown in a representative manner in FIG. 2. It should be noted that for purposes of clarity, second conventional resistive heater 18 is not included in FIG. 2. As indicated above, when desirable, second conventional resistive heater 18 is wound on the probe 22 proximate to conventional resistive heater 16.

PTC resistive heater 14 is located in a thermally conductive relationship with the external surface of the sensor, preferably with leading edge 26 of strut 24. The elements of PTC resistive heater 14 are preferably made in accordance with U.S. Pat. No. 4,121,088.

Figure 3:
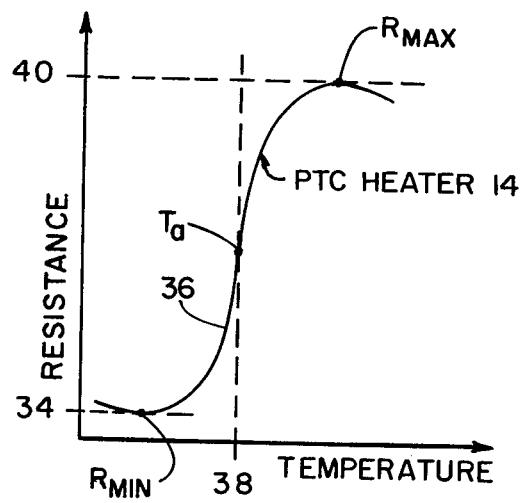
FIG. 3 is a graph showing the temperature versus resistance characteristic of a PTC resistive heater used with the present invention.

FIG. 3 shows the temperature versus resistance characteristic of one embodiment of PTC resistive heater 14. At turn-on, PTC resistive heater 14 is at ambient temperature, typically a rather low temperature. Resistance will be at $R_{min}$, shown at 34. With a low rate of heat dissipation at the external surface of flow sensor 20, such as during conditions of low rates of fluid flow, the temperature of PTC resistive heater 14 rapidly rises. As temperature increases, the operating point of PTC resistive heater 14 moves along operating line 36 and stabilizes at the anomaly (or Curie) temperature, $T_a$, shown at 38. This temperature is dependent on the PTC material selected for use herein and is preferably approximately 125° C. PTC resistive heater 14 is self-regulating at this point with respect to temperature. That is, in response to an increased rate of heat dissipation at the external surface of sensor 20, cooling PTC resistive heater 14 below $T_a$, PTC resistive heater 14 will decrease its resistance approaching $R_{min}$, causing an increase in current in the circuit, resulting in an increase in power according to the known relationship of power, voltage and current. Conversely, in response to a temperature rise due to a decreased rate of heat dissipation at the external surface of sensor 20, which increases temperature above $T_a$, PTC resistive heater 14 will increase its resistance toward its maximum value, $R_{max}$, shown at 40. This will reduce circuit current and consequently reduce PTC resistive heater 14 power. Both of the foregoing responses drive PTC resistive heater 14 back toward stabilization at $T_a$.

The foregoing establishes the basis for the principle of operation of the invention. As shown in FIG. 1, PTC resistive heater 14 and conventional resistive heater 16 are electrically connected in series. In such series circuit, the current will be constant throughout, and voltage will be divided among the various components proportional to the resistance of each individual component. Accordingly, as the variation of resistance in PTC resistive heater 14 functions to vary the current to itself, it also simultaneously varies current to conventional resistive heater 16. Circuit power is directly related to circuit resistance. The result is that PTC resistive heater 14, by controlling its own power through its variation in resistance responsive to temperature, controls power in conventional resistive heater 16 responsive to such temperatures as well. FIG. 3 shows that PTC resistive heater 14 resistance is a function of its temperature, which in turn is a function of rate of heat dissipation therefrom. When PTC resistive heater 14 is disposed in sensor 20 as shown in FIG. 2, the rate of heat dissipation therefrom is principally influenced by the fluid flow rate and moisture content of fluid flow 32, impinging on leading edge 26 since PTC resistive heater 14 is in a thermally conductive relationship with leading edge 26. The result is the desired passive heater power control responsive to temperature of the fluid flow.

Figure 4:
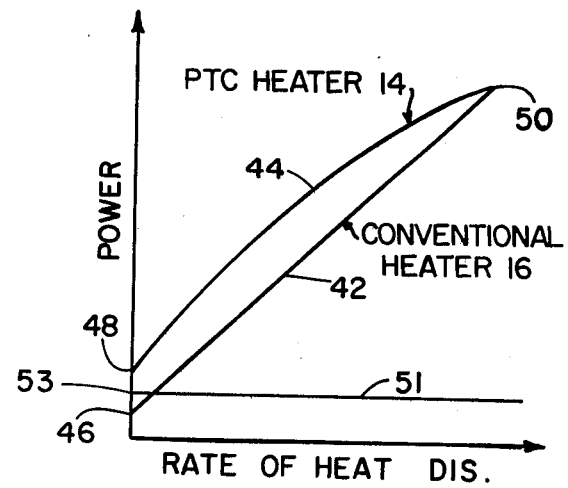
FIG. 4 is a graph representative of heat dissipation versus individual heater power for the heater of the instant invention.

FIG. 4 further illustrates the above principle. It shows the relationship of individual heater power and the rate of heat dissipation at the external surface of sensor 20. Curve 42 represents conventional resistive heater 16 and curve 44 represents PTC resistive heater 14. Points 46 and 48 represent power at the minimum rate of heat dissipation, as when the air vehicle is at rest on the ground, for conventional resistive heater 16 and PTC resistive heater 14 respectively. Under this condition, neither heater is operating at very high power. The temperature of PTC resistive heater 14 is at $T_a$, as indicated at 38 in FIG. 3. The temperature of the conventional resistive heater 16 is lower than that of PTC resistive heater 14 since the resistance of conventional resistive heater 16 is less than that of PTC resistive heater 14 when PTC resistive heater 14 is operating at $T_a$. This relatively low temperature, corresponding to the power at point 46, illustrates why inclusion of second conventional resistor heater 18, shown in FIG. 1, may be desired. Generally it is desirable that air data sensor 20 operate under all conditions at a temperature sufficient to ensure that water droplets do not form in or on probe 22. This may occur during ground operations of air vehicles. Droplets that form in probe 22 are capable of closing off air passages, resulting in erroneous air data parameter calculations. The anomaly temperature is sufficient to preclude the formation of droplets in the portion of sensor 20 heated by PTC resistive heater 14. However, the probe tip, where icing is critical, is heated by conventional resistive heater 16. The lower temperature of this heater may not be sufficient to preclude icing. This points to the use of second conventional resistive heater 18.

When connected directly to a power source, second conventional resistive heater 18 operates at its maximum rated power as indicated by curve 51 in FIG. 4 and is unaffected by variations in the resistance of the PTC resistive heater 14. When connected in parallel with the PTC resistive heater 14 as shown in FIG. 1, second conventional resistive heater 18 operates at maximum rated power when the rate of heat dissipation from the external surface is at a minimum. Its power gradually decreases as the resistance of PTC resistive heater 14 decreases in response to an increasing rate of heat dissipation. Total power to probe 22, then, is a summation of the power to the two heaters in probe 22 which is equal to a summation of curve 42 and curve 51 at any given rate of heat dissipation. The maximum rated power of second conventional resistive heater 18 is selected to ensure that during conditions of minimum rate of heat dissipation, the power that it supplies, shown at point 53, in addition to the power from the conventional resistor heater 16, shown at point 46, results in a temperature in probe 22 that is sufficient to perform the anti-icing function by preventing formation of water droplets therein without heating probe 22 to temperatures that could result in damage to the heaters or in deterioration of probe 22. The range of resistance values for second conventional resistive heater 18 preferably is 200 to 300 ohms.

Total heater power to sensor 20 is a summation of the power dissipated in PTC resistive heater 14, conventional resistive heater 16 and second conventional resistive heater 18. On FIG. 4, the summation of curves 42, 44 and 51 for any given rate of heat dissipation provides this value. It should be noted that since the resistance of conventional resistive heater 16 is selected to be substantially equal to $R_{min}$ of PTC resistive heater 14, the two heaters will be operating at substantially equal power under conditions of maximum rate of heat dissipation. Accordingly, point 50 represents the coincident terminuses of curves 42 and 44. Value of total power under conditions of maximum rate of heat dissipation is then equal to twice the power at point 50 plus the power indicated by curve 51.

Figure 5:
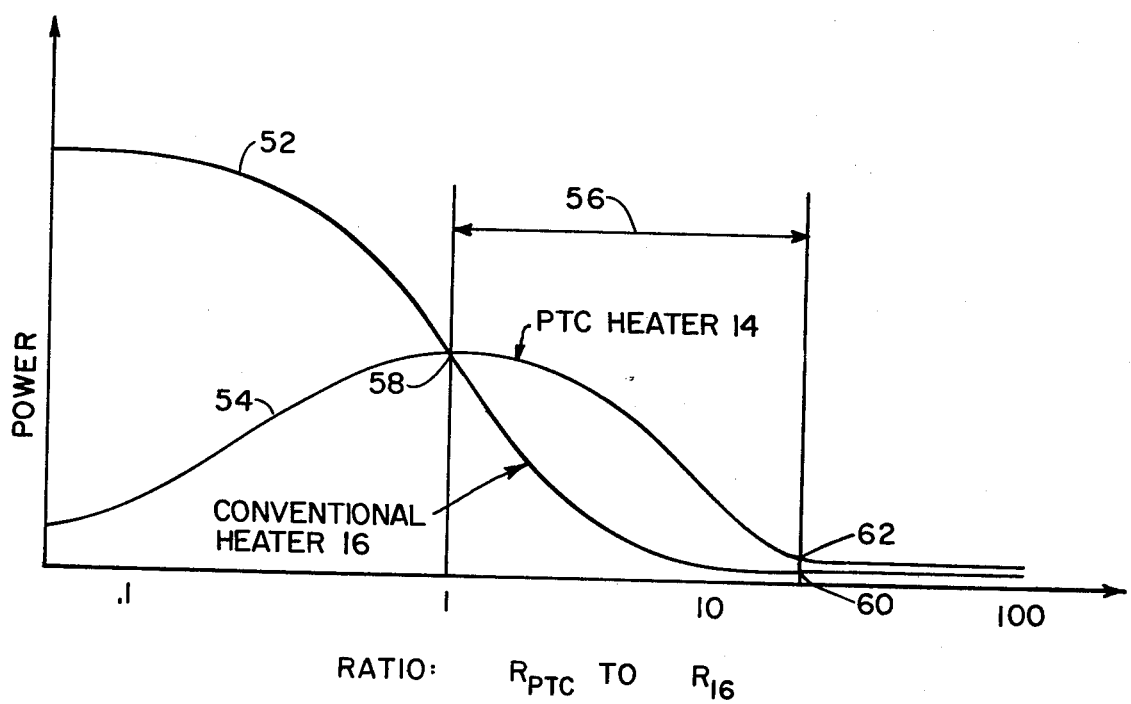
FIG. 5 is a graph showing the relationship of individual heater power to the ratio of the resistances of the PTC resistive heater and the conventional resistive heater used in the present invention.

FIG. 5 deals with the relationship of the power from PTC resistive heater 14 and conventional resistive heater 16 as a function of the ratio of their resistances. Second conventional resistive heater 18 is not considered in the figure. Curve 52 represents conventional resistive heater 16 and curve 54 represents PTC resistive heater 14. Point 58, where the ratio is one, is known as the crossover point and corresponds to point 50 in FIG. 4. At this point the dominant heater with respect to the amount of power supplied switches from one to the other. Conventional resistive heater 16 dominates operation to the left of crossover point 58, and the PTC resistive heater 14 dominates operation to the right of the crossover point 58. Known uses of the PTC characteristic have concentrated on its switching ability and, accordingly, have operated on both sides of the crossover point 58 utilizing the PTC characteristic essentially as a digital switch from one heater to the other. The instant invention operates solely to the right of the crossover point, typically between the ratios 1:1 and 50:1, in the region indicated by line 56. Here the PTC characeristic functions to continuously control total heater power in response to rate of heat dissipation from the PTC resistive heater. It should be noted that points 60 and 62 indicate heater operation at the minimum rate of heat dissipation and, accordingly, correspond to points 46 and 48 respectively in FIG. 4.

As herein described, the invention satisfies the requirements of providing passive heater power control that is continuously variable as a function of rate of heat dissipation from the external surface of the sensor. It differs from previous uses of PTC material, typified by the cited coffee pot heating unit, in that it utilizes the PTC characteristic to vary the cooperative heating of the conventional resistive heater and the PTC resistive heater in an analog fashion to provide continuous variable control rather than using the PTC characteristic essentially as a digital switch.

What is claimed is:

1. An improved heater for use in a fluid flow stream data sensor, the sensor comprising a probe and support means each having an external surface disposed in a flow stream, the flow stream causing varying rates of thermal conduction from such surfaces, the probe having a sensing means supported therein for sensing at least one desired parameter and the support means being coupled to the probe for positioning the probe as desired relative to the flow stream, wherein the improved heater comprises:

first heater means disposed in the probe for providing a portion of the heating thereof, which heater means has substantially constant resistance across the normal operating range of temperatures, positive temperature coefficient heater means disposed in the sensor in a thermally conductive relationship with the external surface thereof and electrically coupled in a series relationship to the first heater means for providing a further portion of the heat to the sensor, the positive temperature coefficient heater means being formed from a positive temperature coefficient resistor which changes abruptly from a minimum to a maximum resistance about a known temperature for providing analog control of the heat output of both the positive temperature coefficient heater means and the first heater means by operating between such minimum and maximum resistance responsive to the varying rates of thermal conduction from the external surface of the sensor, and second heater means having substantially constant resistance across the normal operating range of temperatures is disposed in the probe to provide further heating to the probe when the second heater means is electrically coupled to a power supply.

2. Apparatus as claimed in claim 1 wherein the positive temperature coefficient heater means is disposed in the support means in a thermally conductive relationship with the external surface thereof.

3. Apparatus as claimed in claim 1 wherein barium titanate is a component in the construction of the positive temperature coefficient heater means.

4. Apparatus as claimed in claim 3 wherein the strut means has a leading edge exposed to the flow stream and wherein the positive temperature coefficient heater means is disposed in the strut means to provide anti-icing and de-icing.

5. Apparatus as claimed in claim 1 selected such that, under conditions of minimum heat dissipation from the external surface of the sensor, the heater produces power sufficient to prevent the formation of water droplets in the probe.

6. Apparatus as claimed in claim 5 selected such that the power produced under conditions of minimum heat dissipation does not result in burn out of the apparatus or contribute to erosion of probe features due to impingement of salt in the airstream when airborne at low altitude.

7. Second heater means as claimed in claim 1 selected such that under conditions of minimum heat dissipation from the external surface of the sensor, such heater means operates at full rated power, which power is sufficient, when summed with the power concurrently produced in the first heater means, to prevent the formation of water droplets in the probe.

8. An improved heater as claimed in claim 1 in which the positive temperature coefficient heater means has a minimum resistance value selected to be substantially the same as the resistance of the first heater means and the maximum resistance value attained is substantially 50 times the resistance of the first heater means.

9. An improved heater as claimed in claim 1 in which the resistance of the first heater means ranges between 8 and 20 ohms, the resistance of the second heater means ranges between 200 and 300 ohms, the minimum resistance of the positive temperature coefficient heater means ranges between 8 and 20 ohms and the maximum attained resistance of the positive temperature coefficient heater means ranges between 400 and 1000 ohms.

10. An improved heater for use in a fluid flow stream data sensor, the sensor comprising a probe and support means each having an external surface disposed in a flow stream, the flow stream causing varying rates of thermal conduction from such surfaces, the probe having a sensing means supported therein for sensing at least one desired parameter and the support means being coupled to the probe for positioning the probe as desired relative to the flow stream, wherein the improved heater comprises:

first heater means disposed in the probe for providing a portion of the heating thereof, which heater means has substantially constant resistance across the normal operating range of temperatures, positive temperature coefficient heater means disposed in the sensor in a thermally conductive relationship with the external surface thereof and electrically coupled in a series relationship to the first heater means for providing a further portion of the heat to the sensor, the positive temperature coefficient heater means being formed from a positive temperature coefficient resistor which changes abruptly from a minimum to a maximum resistance about a known temperature for providing analog control of the heat output of both the positive temperature coefficient heater means and the first heater means by operating between such minimum and maximum resistance responsive to the varying rates of thermal conduction from the external surface of the sensor, and second heater means electrically connected in parallel with the positive temperature coefficient heater means for cooperating with the first heater means in heating the probe.

* * * * *